Figure 2:
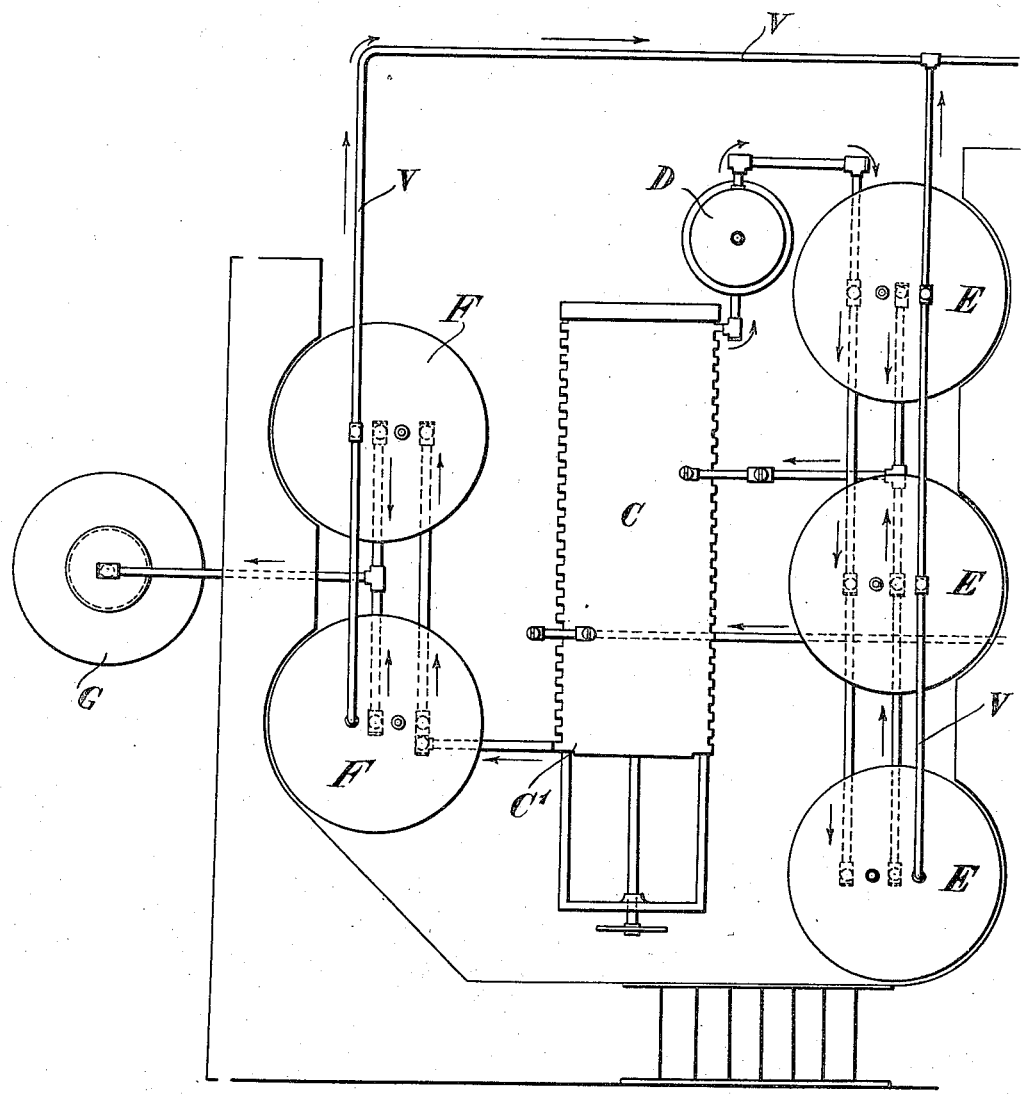

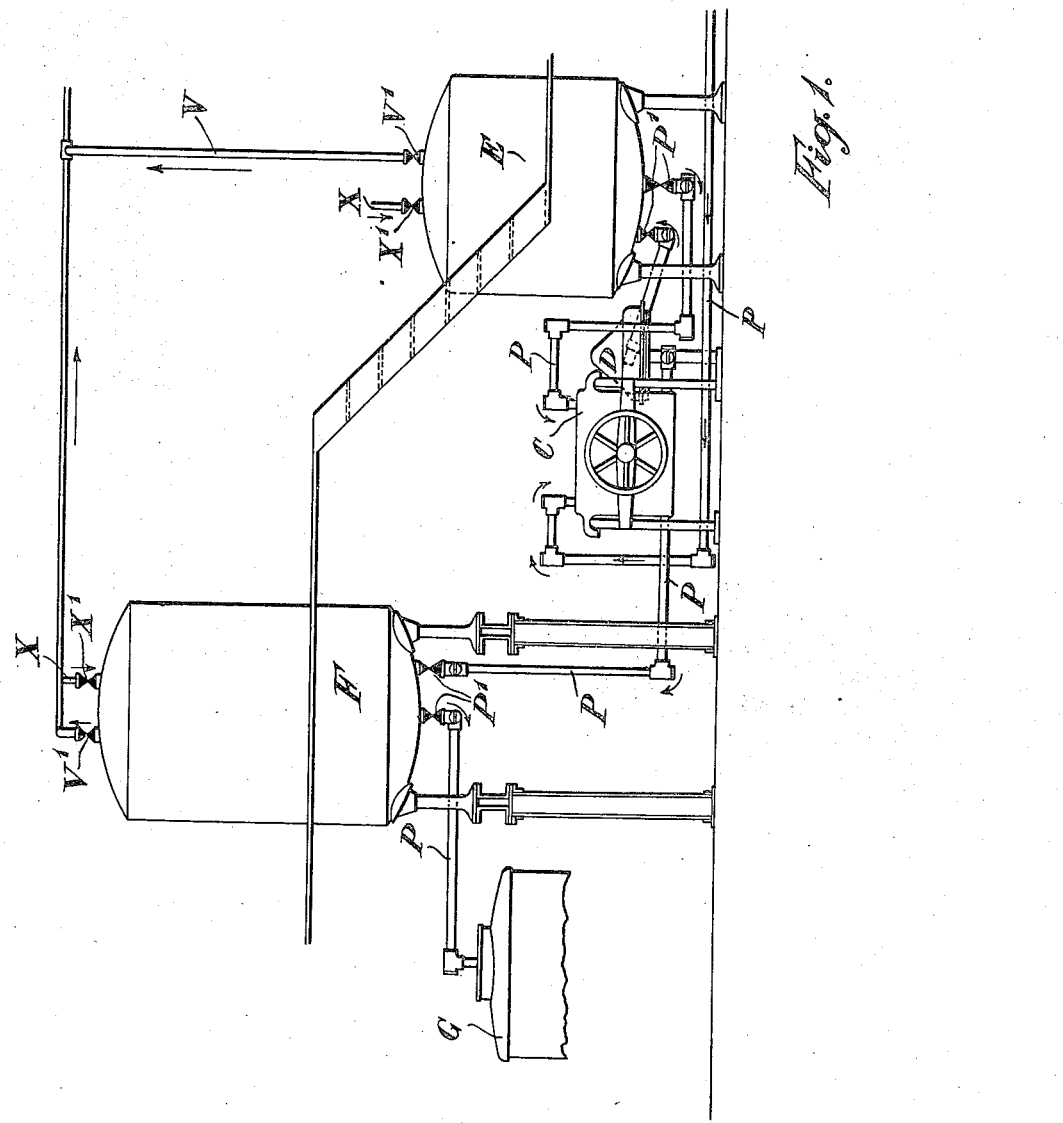

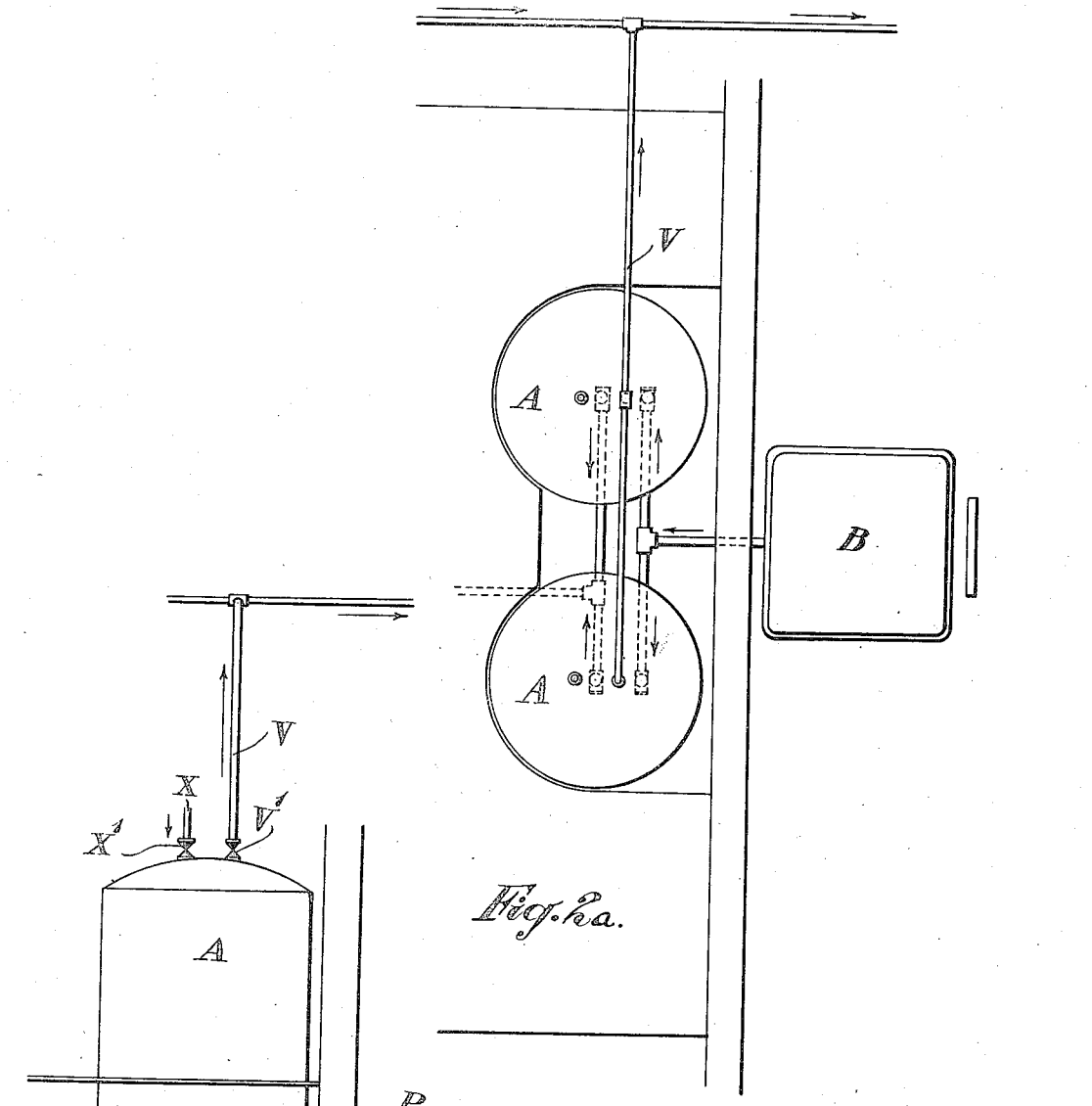

Patented July 13, 1926.

UNITED STATES PATENT OFFICE.

ERNEST ALFRED SHEPHEARD, OF WEMBLEY HILL, ENGLAND.

METHOD OF PASTEURIZING MILK OR OTHER LIQUIDS.

Application filed March 24, 1924, Serial No. 701,565, and in Great Britain October 26, 1923.

This invention relates to improvements in the method of and apparatus for Pasteurizing milk or other liquids, particularly fresh milk, under conditions which will completely eliminate all possibility of contamination from any source whatever during the treatment of the liquid.

According to this invention the complete process of Pasteurizing the liquid is carried out under a vacuum or partial vacuum.

The liquid is stored in suitable closed airtight vessel connected with vacuum apparatus and communicating through a heater and a filter with a holding vessel, which is also air-tight and connected with the vacuum apparatus. From the holding vessel the liquid is subsequently drawn through a cooler and thence to a cold liquid storage tank whence it is drawn off as required to the filling apparatus.

All the vessels used are airtight and connected with the vacuum apparatus and a sufficient number of each is used to allow of the process being carried on continuously.

The whole equipment when disconnected from the vacuum apparatus can be completely sterilized by pressure steam as all parts are airtight.

Figs. 1 and 1ª together constitute a diagrammatic side elevation of a plant or apparatus adapted to allow of the process of Pasteurizing liquids according to the invention, Fig. 1ª being a continuation of Fig. 1.

Figs. 2 and 2ª are a diagrammatic side elevation of the same, Fig. 2ª constituting a continuation of Fig. 2.

In these drawings AA represents the closed airtight vessels into which the liquid to be treated or Pasteurized is admitted from the tip tank B; C is the heater and D the filter through which the liquid is caused to flow on its way to one or other of the airtight holding tanks E. C' is the cooler through which the liquid passes from the holding tanks E to the cold liquid outlet storage tanks FF whence it passes to the filling apparatus G.

The vessels A, E and F are connected by pipes V with any suitable form of vacuum apparatus each pipe being provided with a stop cock V' and all the parts of the apparatus are connected together by pipes P having stop cocks P'. The vessels A, E and F are each connected by a pipe X fitted with a stop cock X' with a source of filtered and sterilized air.

The mode of operation is as follows:—

The liquid to be Pasteurized is tipped into the tank B and passes by the admission pipe P, connecting the tanks B and A, to one of the tanks A. The vacuum pipe V on this tank A is then opened causing the liquid to be sucked up into that tank from the tip tank B until filled. The cocks P' and V' on the admission and vacuum pipes respectively are then closed. The cock X' on the sterilized air pipe X of the tank A, the cock P' on the outlet pipe from the tank A, and the cock V' on the vacuum pipe connected with one of the holding tanks E, are then all opened. This will cause the liquid to pass from the vessel A through the heater C and filter D to the holder tank E, where it is allowed to remain for a predetermined period of time, after which it is passed through the cooler C' to one of the outlet storage tanks F by connecting said tank F with the vacuum apparatus and the operation of the proper stop cocks. From the storage tank F the liquid flows by gravity to the filling apparatus G.

During the period of time in which the liquid remains in the holder tank E additional liquid to be Pasteurized can be admitted to another of the series of such tanks in the plant and so on with the storage tanks A and F for the incoming and the outgoing liquid respectively.

The heater C, filter D and cooler C' may be of any suitable type and are only conventionally represented in the accompanying drawings.

I claim:

A method of Pasteurizing liquids which consists in utilizing a vacuum in advance of the moving liquid to cause said liquid to flow from the storage tanks to the holding tanks, from the holding tanks through the heat interchanging and liquid filtering apparatus to the final storage tanks, whereby to complete the Pasteurizing travel of the liquid while sealed against the admission of air.

In testimony whereof I have hereunto set my hand this sixth day of March, 1924.

ERNEST ALFRED SHEPHEARD.